United States Patent [19]
Osawa

[11] Patent Number: 6,159,632
[45] Date of Patent: Dec. 12, 2000

[54] BATTERY ACCOMMODATING STRUCTURE FOR ELECTRONIC EQUIPMENT

[75] Inventor: Takahisa Osawa, Shizuoka, Japan

[73] Assignee: NEC Corporation, Tokyo, Japan

[21] Appl. No.: 09/225,611

[22] Filed: Jan. 5, 1999

[30] Foreign Application Priority Data

Jan. 5, 1998 [JP] Japan ................................. 10-000228

[51] Int. Cl.$^7$ .................................................. H01M 2/10
[52] U.S. Cl. .............................. 429/100; 429/97; 429/98; 429/163
[58] Field of Search ................................ 429/96, 97, 98, 429/100, 163

[56] References Cited

U.S. PATENT DOCUMENTS

| | | | |
|---|---|---|---|
| 5,639,570 | 6/1997 | Tamaru | 429/97 |
| 5,722,705 | 3/1998 | Deguchi | 292/87 |
| 5,728,486 | 3/1998 | Tamaru | 429/97 |
| 5,882,816 | 3/1999 | Gotou | 429/100 |

*Primary Examiner*—Maria Nuzzolillo
*Assistant Examiner*—Tracy Dove
*Attorney, Agent, or Firm*—Ostrolenk, Faber, Gerb & Soffen, LLP

[57] ABSTRACT

There is provided a battery accommodating structure in electronic equipment such as a portable computer or the like, which structure is suitable for a general-purpose large-capacity battery and can implement miniaturization of the device and enhancement of resistance to drop impact. In the battery accommodating structure, a first engagement portion (15) which is engaged with a first hook portion (14) formed on the inner surface of one end portion of a battery cover (3) is formed on the outer wall of a housing (4) just below an opening portion of a battery accommodating room (31), and a second engagement portion (13) which is engaged with a second hook portion (12) formed on the end face plate of the other end portion of the battery cover (3) is formed on the wall surface of the housing (4) which constitutes one inner end of the battery accommodating room (31). Further, an electrode portion (2) connected to an electrode (32) of a battery (1) is provided at the other inner end of the battery accommodating room (31). A lock piece (6) is interposed between the battery (1) and the end face plate of the battery cover (3) having the second hook portion (12) in a state where the opening portion is closed by the battery cover (3) and the battery (1) in the battery accommodating room (31) is moved toward the electrode portion (2), thereby preventing the movement of the battery cover (3) relatively to the housing (4).

9 Claims, 7 Drawing Sheets

BATTERY ACCOMMODATING STRUCTURE FOR ELECTRONIC EQUIPMENT

BACKGROUND OF THE INVENTION

1. Field of the Invention

The present invention mainly relates to an improvement of the structure for accommodating a battery which is mounted in electronic equipment such as a portable computer or the like, and particularly to an improvement of a battery accommodating structure which is provided with a battery accommodating room having an opening portion formed in one face of a housing of the electronic equipment, and a battery cover for closing the opening portion.

2. Description of the Related Art

Recently, the mobile computing has grown prosperous and a mini note type personal computer which is achieved by further miniaturizing a portable computer having a color display, that is, a so-called conventional note type personal computer has appeared. However, the mobile computing has the following problems to be settled.

A first subject to be achieved resides in the miniaturization of electronic equipment (personal computer) to implement the environments of the mobile computing. However, although the miniaturization of the electronic equipment is a subject to be achieved, it is very useful for a user of electronic equipment that the display screen and keyboard thereof are designed in properly large size. Accordingly, with respect to parts other than the display screen and the keyboard, it has been highly required to design these parts so that the projection areas of the parts on the mount plane therefor in the electronic equipment are reduced at maximum. Further, the same requirement has been made to the thickness of the electronic equipment and if the electronic equipment is designed in large thickness in order to suppress the projection areas of the parts, it is contradictory to the miniaturization requirement of the electronic equipment.

A second subject to be achieved resides in the increase of the capacity of batteries to keep a sufficient driving time even for a portable computer needing large power consumption which is equipped with a color display, etc. On the other hand, the volume and shape of the battery greatly affects the volume of the electronic equipment. Considering this problem in combination with the first subject, the miniaturization of the battery is also needed in order to promote the miniaturization of the electronic equipment. However, the reduction of the volume of the battery results in reduction of the capacity of the battery. This is contradictory to the capacity increasing requirement.

A third subject to be achieved resides in the reduction of large loads which is needed to develop special-purpose batteries. In order to achieve the first and second subjects, for a large number of electronic equipment (personal computers), battery packs which are exclusively used for the electronic equipment are developed and produced while ornamented as external mount parts. The special-purpose batteries are more deteriorated than general-purpose batteries in all respects such as development term, development cost, unit price, etc.

A fourth subject to be achieved resides in the enhancement of the resistance to drop impact of the electronic equipment. In the mobile computing environments, it is an important subject to enhance the resistance to drop impact of the electronic equipment. Besides, as described above, such a structure that a battery serving as the most important part to drive the electronic equipment is exposed to the outside as an external mount part is not favorable. This is because if drop impact is directly applied to the battery, the battery would be broken and the electronic equipment could not be driven.

SUMMARY OF THE INVENTION

The present invention has been implemented in view of the foregoing situation, and has an object to provide a battery accommodating structure in electronic equipment such as a portable computer or the like, which structure is suitably used for a general-purpose large-capacity battery and can implement miniaturization of the electronic equipment and enhance the resistance to drop impact.

According to the present invention, there is provided a battery accommodating structure having a battery accommodating room which has an opening portion formed in one surface of a housing of electronic equipment, and a battery cover for closing the opening portion, wherein first engagement means for making an engagement between one end portion of the battery cover and a first portion of the housing which faces the one end portion of the battery cover, and second engagement means for making an engagement between the other end of the battery cover and a second portion of the housing which faces the other end portion of the battery cover are provided. In the battery accommodating structure, an electrode portion connected to an electrode of a battery is disposed in the neighborhood of the first portion of the housing, the battery cover is moved toward the second portion relatively to the housing while the one end portion thereof is engaged with the first portion to substantially close the opening portion, thereby enabling the engagement of the other end portion thereof with the second portion, and, a lock piece is interposed between the battery and the other end portion of the battery cover while the battery disposed in the battery accommodating room is moved toward the first portion and the electrode of the battery is connected to the electrode portion, thereby preventing movement of the battery cover to the first portion of the housing and keeping the engagement between the other end portion of the battery cover and the second portion of the housing.

In one aspect of the present invention, the lock piece is interposed between the battery and the other end portion of the battery cover, thereby preventing movement of the battery toward the second portion of the housing and keeping the connection between the electrode of the battery and the electrode portion.

The first engagement means may comprise a first hook portion provided to one end portion of the battery cover and a first engagement portion provided to the first portion of the housing, and the second engagement means may comprise a second hook portion provided to the other end portion of the battery cover and a second engagement portion provided to the second portion of the housing. The first hook portion may be formed on an inner surface of the battery cover, and the first engagement portion may be formed on the side surface of the housing just below the opening portion. The second hook portion may be formed on the end surface plate of the battery cover, and the second engagement portion may be formed on the wall surface of the housing which constitutes the inner surface of the end portion of the battery accommodating room. It is preferable that the first hook portion is allowed to be detached from the first engagement portion in a first state where the battery cover is nearer to the first portion of the housing, and is inhibited from being detached from the first engagement portion in a second state where the battery cover is nearer to the second portion of the housing.

In another aspect of the present invention, the battery accommodating structure further includes moving means for moving the lock piece in a direction crossing a direction of the movement of the battery cover, the moving means being connected to an operating piece disposed on the outer surface of the housing. The moving means may have a lock mechanism which is held in an advance state where the lock piece advances to a gap between the battery and the other end of the battery cover and in a retreat state where the lock piece retreats from the gap between the battery and the other end portion of the battery cover.

The battery accommodating structure may include temporarily fixing means for temporarily fixing the battery in a state where the battery is moved toward the first portion of the housing, the temporarily fixing means being provided in the battery accommodating room.

DETAILED DESCRIPTION OF THE PREFERRED EMBODIMENTS

Preferred embodiments in which the battery accommodating structure of the present invention is mounted in a portable computer will be described with reference to the accompanying drawings.

Figure 1A:
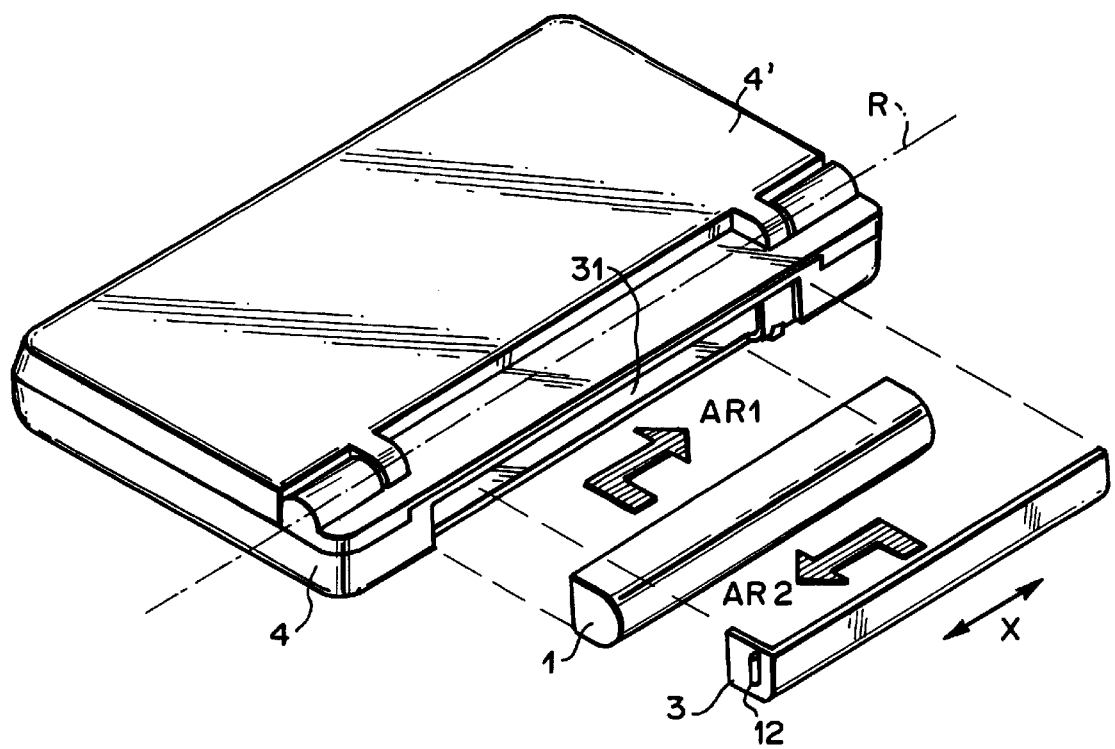
FIGS. 1A and 1B are perspective views showing a battery mount state in a battery accommodating portion of a first embodiment of the present invention.
Figure 1B:
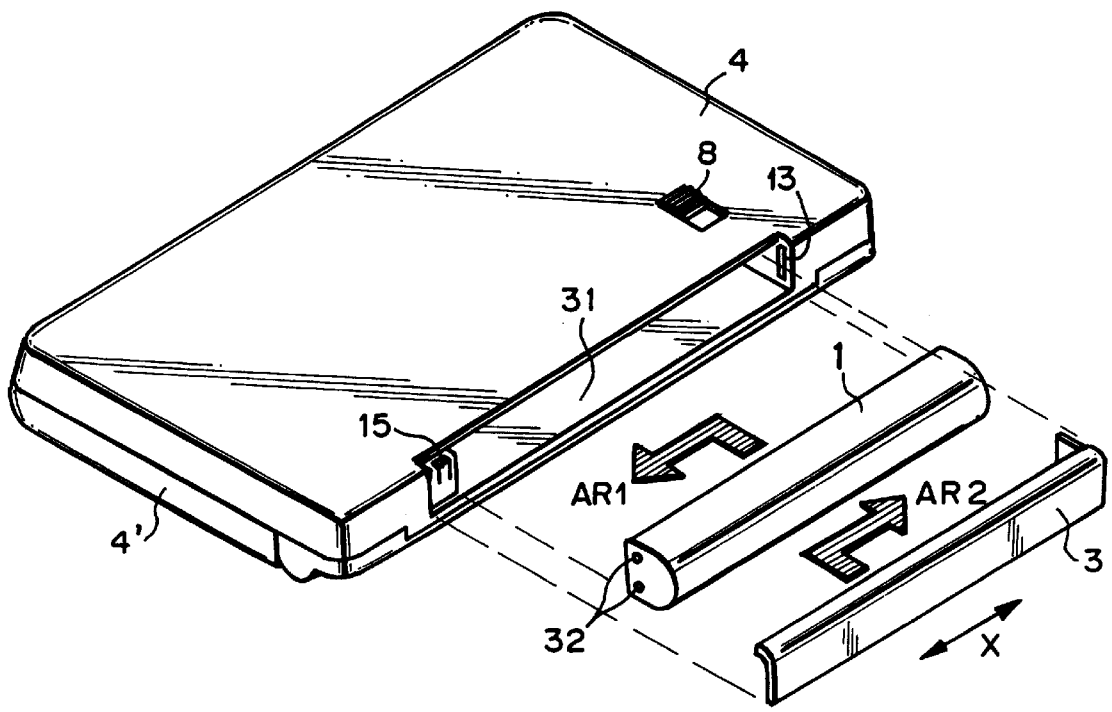
Figure 2:
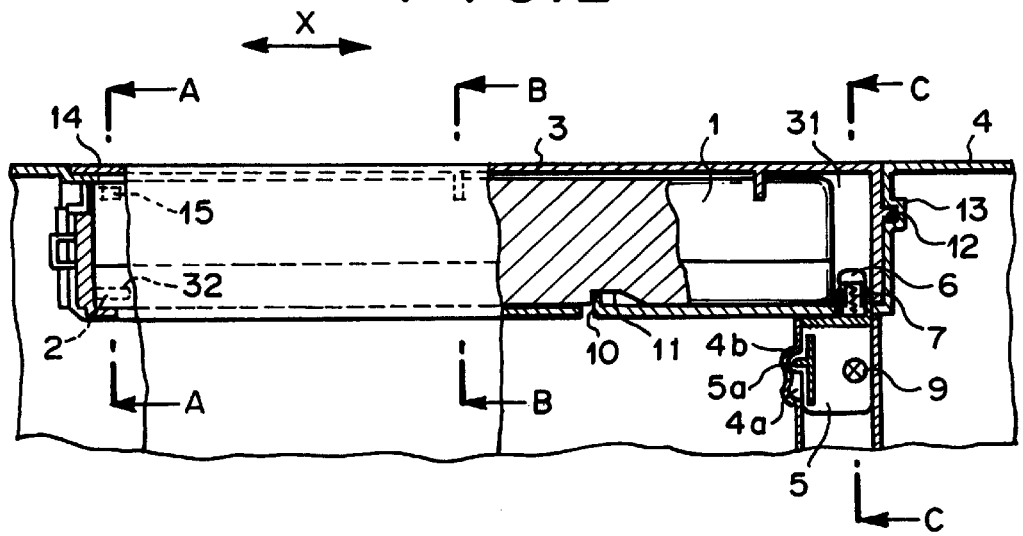
FIG. 2 is a cross-sectional view showing the battery accommodating portion of the first embodiments.

FIG. 1A is a perspective view showing the top face of the overall electronic equipment, and FIG. 1B is a perspective view showing the bottom face of the overall electronic equipment. FIG. 2 shows such a state that a battery is accommodated in a battery accommodating room and an opening portion is closed by a battery cover.

Referring to FIGS. 1A, 1B, 2, 3A, 3B, 3C, 4A, 4B, in a battery accommodating structure which is provided with a battery accommodating room 31 having an opening portion formed in one surface of an electronic equipment housing 4, and a battery cover 3 for closing the opening portion, a first engagement portion 15 which is engaged with a first hook portion 14 formed on the side surface at the inner side of one end portion of the battery cover 3 with respect to the X direction is formed on the outer wall of the opening portion, and a second engagement portion 13 which is engaged with a second hook portion 12 formed on the end surface of the other end portion of the battery cover 3 is formed on the inner surface of one end portion of the battery accommodating room 31. Further, an electrode portion 2 which is connected to an electrode 32 of a battery 1 is provided at the other end portion of the battery accommodating room 31.

In a state where the first hook portion 14 is engaged with the first engagement portion 15 and the opening portion is closed by the battery cover 3, the battery cover 3 is movable at the opening portion in the X direction relatively to the housing 4 so that the second hook portion 12 is engageable with the second engagement portion 13, and in a state where the battery 1 in the battery accommodating room 31 is shifted toward the electrode portion 2, a lock piece 6 is interposed between the battery 1 and the end portion of the battery cover 3 having the second hook portion 12 to prevent the movement of the battery cover 3 relatively to the opening portion.

Figure 3A:
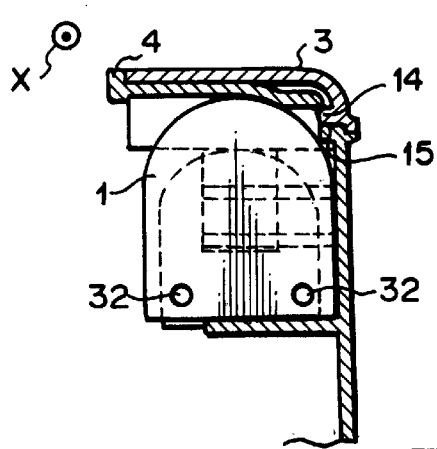
FIGS. 3A to 3C are cross-sectional views taken along A—A line, B—B line and C—C line of FIG. 2, respectively.
Figure 3B:
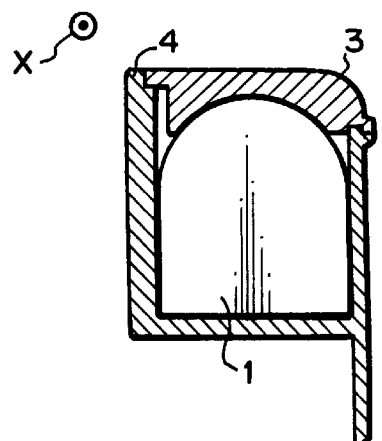
Figure 3C:
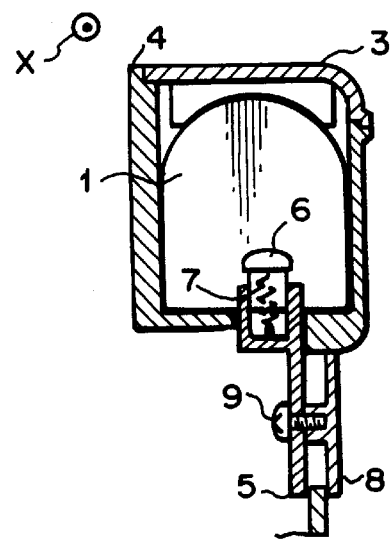

In this embodiment, the battery 1 is designed as a general-purpose large-capacity battery so that the electrode 32 provided on one end surface thereof is inserted into the electrode portion 2 of the housing 4, whereby an electrical conduction state is established. As described above, the battery cover 3 is slid in the opposite direction (as indicated by an arrow AR2) to the mount direction of the battery 1 (as indicated by an arrow AR1) and the second hook portion 12 is engaged with the second engagement portion 13, whereby the battery cover 3 is fixed to the housing 4. At this time, the first hook portion 14 is engaged with the first engagement portion 15, and further a rib provided to the battery cover 3 is deeply engagedly inserted into the opening portion of the housing 4 as shown in FIGS. 3B and 3C, so that the cover 3 is not easily detached.

After the battery 1 and the battery cover 3 are installed via or into the opening portion, the lock piece 6 is inserted into a movement space formed between the battery 1 and the battery cover 3 as shown in FIGS. 2 and 3D, whereby the electrical conduction state between the electronic equipment and the battery 1, the fixation of the battery 1 and the lock state of the battery cover 3 can be made perfect.

By adopting the above structure, the battery accommodating room 31 can be efficiently laid out at the center of the back surface portion of the housing 4 as shown in FIGS. 1A and 1B, and this layout contributes to the miniaturization of the electronic equipment. In addition, the battery 1 accommodated in the battery accommodating room 31 is perfectly covered by the battery cover 3, so that even when a device (electronic equipment) is dropped by mistake and a drop impact is applied to the housing 4 or the battery cover 3, the impact is prevented from being directly applied to the battery 1, and thus the failure probability of the device can be reduced.

In this embodiment, the battery accommodating room 31 and the battery 1 are provided with temporarily fixing means for making engagement between the battery accommodating room 31 and the battery 1 while the battery 1 is moved toward the electrode portion 2. That is, as shown in FIG. 2, a leaf spring type hook 10 which is bendable with its elasticity is formed on the wall surface of the battery accommodating room 31, and the tip thereof is projected to the inside of the battery accommodating room 31 and engagedly inserted into an engagement groove portion 11 formed on the battery 1.

Further, the lock piece 6 is designed so as to advance/retreat into/from the battery accommodating room 31 in the direction crossing the movement direction X of the battery cover 3 and so as to be kept in a selected advance or retreat state by a lock mechanism.

In this embodiment, with the lock mechanism, the lock piece 6 is mounted to a slider 5 and elastically kept at the advance side by the lock piece spring 7. Further, an operating piece 8 located at the outside and the slider 5 are linked to each other by a screw 9 through a guide slit formed in the housing 4 in parallel to the movement direction of the lock piece 6. A notch projection 5a for setting the positions of the advance state and the retreat state is formed in the slider 5, and a pair of notch grooves 4a, 4b into which the projection 5a is engagedly inserted are formed at the housing 4.

As described above, the lock piece 6 itself has an independent lock mechanism, and thus the lock piece 6 is prevented from moving inadvertently. The provision of the lock piece spring 7 can transmit an engagement release feeling to an operator when detaching the battery cover 3. Further, the temporarily fixing means functions to temporarily fix the battery during the time period from the time when the operator loads the battery 1 into the battery accommodating room 31 until the time when the operator manipulates the operating piece 8 to insert the lock piece 6 into the gap between the battery 1 and the battery cover 3 to lock both the battery 1 and the battery cover 3.

When the battery 1 is loaded into the electronic equipment, as shown in FIGS. 1A and 1B, the battery 1 is temporarily accommodated via the opening portion into the battery accommodating room 31, and then slid toward the electrode portion 2 in the direction indicated by the arrow AR1 to establish the electrical conduction. Thereafter, the battery cover 3 is set so as to temporarily cover the opening portion (at this time, the first hook portion 14 is engaged with the first engagement portion 15) and then slid in the opposite direction (indicated by the arrow AR2) to the movement direction of the battery 1, and the second hook portion 12 is inserted into the second engagement portion 13.

Next, the procedure of exchanging a battery will be described with reference to FIGS. 2, 3A, 3B, 3C, 4A, 4B, 5A, 5B.

Figure 4A:
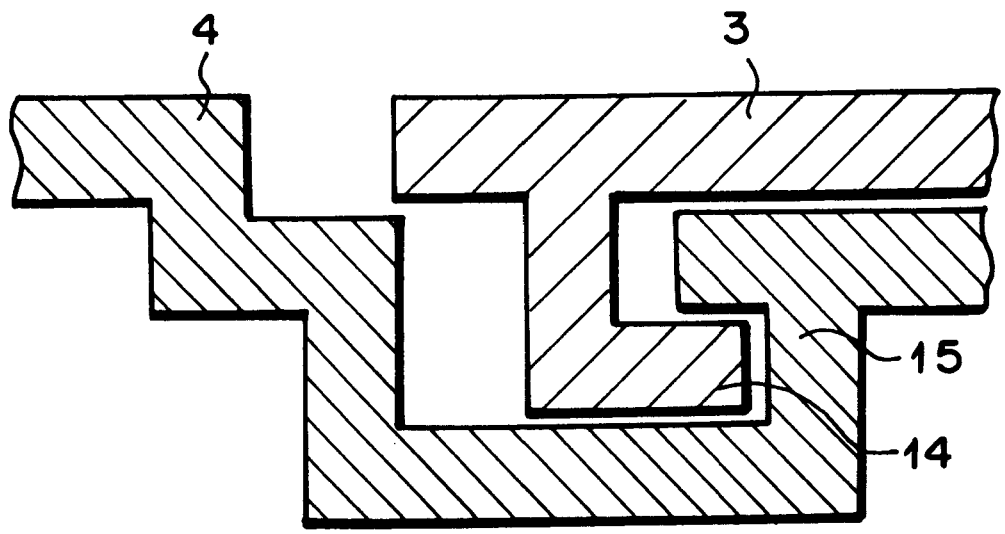
FIGS. 4A and 4B are enlarged views showing the relationship between a hook portion and an engagement portion shown in FIGS. 2 and 3A.

As shown in FIG. 2, the battery 1 is in the electrical conduction state (the electrode portion 2 and the electrode 32 are connected to each other), and the battery cover 3 is fixed (i.e., the electronic equipment is in a normal use state). In this case, as shown in FIG. 3A, the battery 1 is accommodated in the battery accommodating room and it is prevented from being detached from the electronic equipment inadvertently. Further, as shown in FIG. 2, the battery cover 3 is also prevented from being detached from the electronic equipment inadvertently because the hook portion 12 is engaged with the engagement portion 13 and also the hook portion 14 is engaged with the engagement portion 15 as shown in FIGS. 3A, 4A. Particularly, according to the present invention, the lock piece 6 is inserted into the gap between the end face of the battery 1 and the support portion of the hook portion 12 of the battery cover 3 as shown in FIG. 3C, so that the battery 1 and the battery cover 3 are restrained from being freely moved in the X direction and thus both the battery 1 and the battery cover 3 are perfectly fixed in the battery accommodating room 31.

Figure 5A:
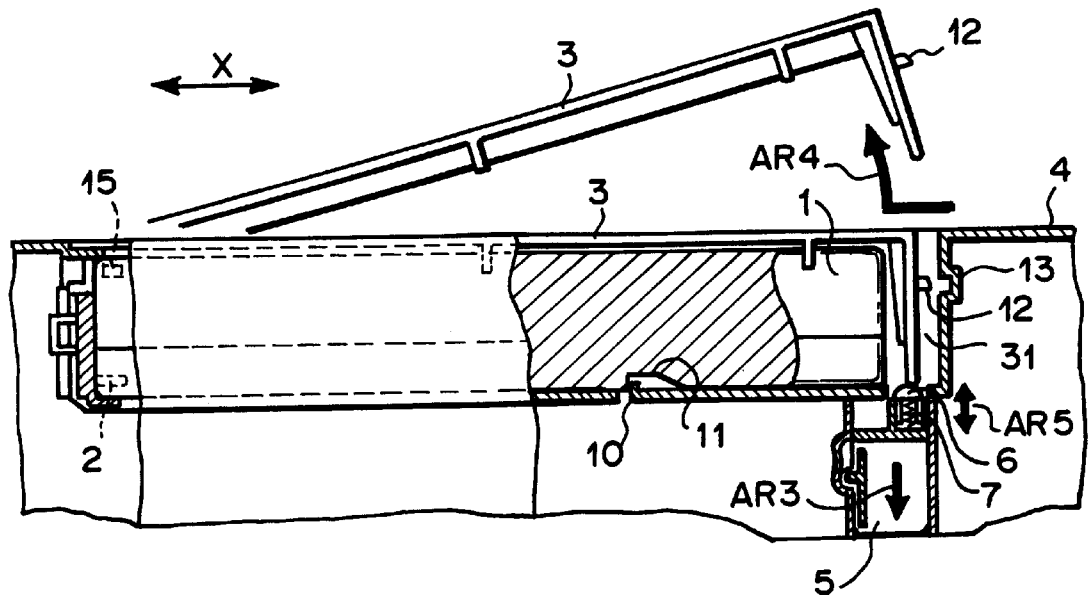
FIGS. 5A and 5B are cross-sectional views showing a working status when a battery is exchanged in the embodiment of the present invention.

FIG. 5A shows detachment of the battery cover 3 in the state of FIG. 2.

Figure 4B:
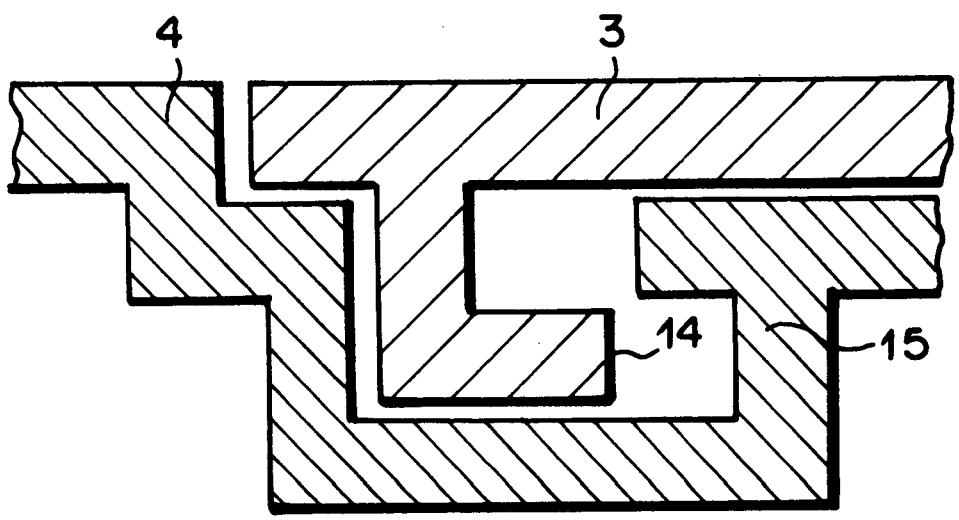

First, a movement space in which the battery cover 3 is slid is formed by moving the slider 5 in the direction indicated by an arrow AR3. Thereafter, the battery cover 3 is slid in the X direction as indicated by an arrow AR4, the hook portion 12 is detached from the engagement portion 13, and also the hook portion 14 is slid in the X direction in the engagement portion 15, so that the engagement between the hook portion 14 and the engagement portion 15 is allowed to be released as shown in FIG. 4B. The battery cover 3 is detached as described above.

If the dimensions of the elements are set so that the holding portion (projecting portion) of the hook portion 12 of the battery cover 3 and the lock piece 6 slightly interfere with each other when the battery cover 3 is slid, the battery cover 3 pushes the lock piece 6 so as to contract the lock piece spring 7. Further, at the instantaneous time when the engagement between the hook portion 12 and the engagement portion 13 is released, the lock piece spring 7 pushes up the battery cover 3 via the lock piece 6, and an operator is provided with a feeling of release of the engagement. An arrow AR5 represents the direction of the operation of the lock piece 6 at that time.

Figure 5B:
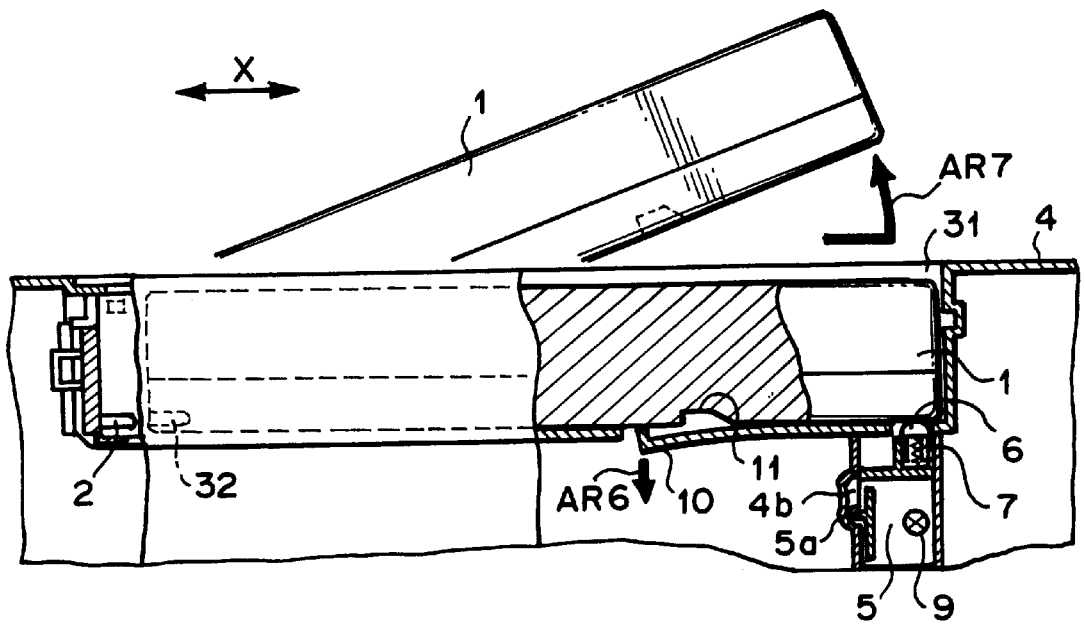

FIG. 5B shows such a state that the battery 1 is detached from the state of FIG. 5A. The engagement state of the temporarily fixing means can be easily released by setting such dimensional relationship that when the battery 1 is slid, proper resistance occurs, and when the battery 1 is forcedly slid, the engagement is released. The operation state of the tip of the leaf spring 10 of the temporarily fixing means at this time is indicated by an arrow AR6. The linkage between the electrode portion 2 and the electrode 32 is released by sliding the battery 1 in the X direction while the temporarily fixing means is released, and the battery 1 is easily taken out from the housing 4 by pulling up the battery 1 as indicated by an arrow AR7.

When the battery 1 and the battery cover 3 are installed into the battery accommodating room 31, it is implemented by executing the reverse procedure to the above procedure. Even when the lock piece 6 enters the battery accommodating room 31 in a state where the battery 1 is not inserted, the battery 1 itself can push the lock piece 6 in the release direction when the battery 1 is loaded into the electronic equipment. As a result, even when the procedure of inserting the battery 1 is erroneous, the parts equipped in the electronic equipment are not broken.

Various functions may be added to the above-described embodiment by making some modifications in shape to the above-described embodiment.

FIGS. 6A, 6B, 7a, 7B show an embodiment in which a battery inverse-insertion preventing means is provided.

Figure 6A:
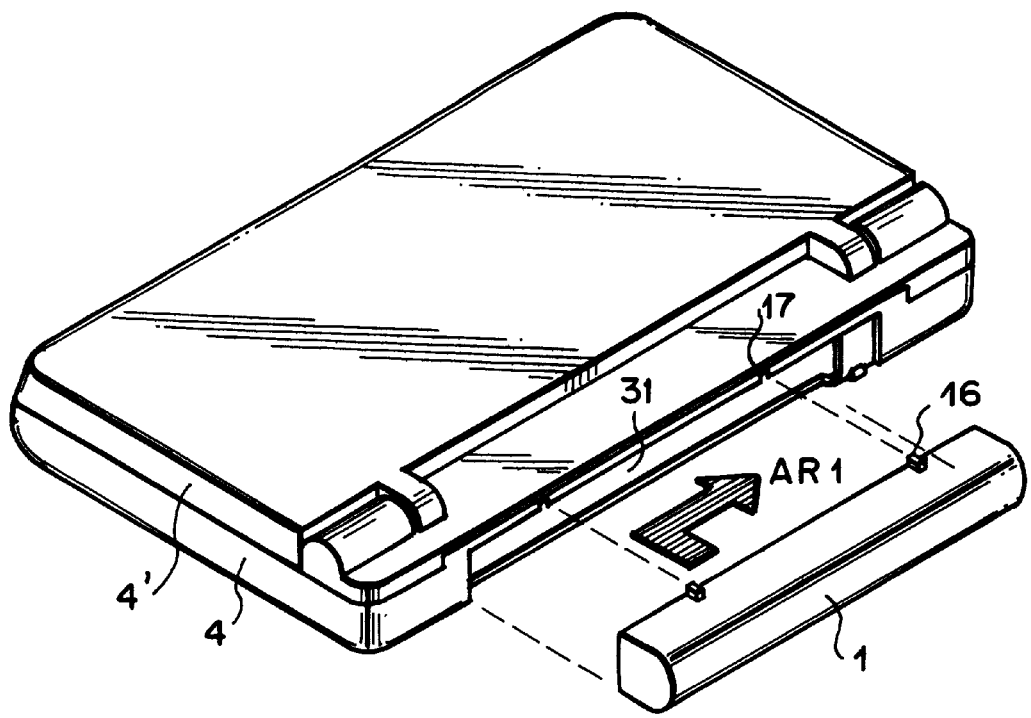
FIGS. 6A and 6B are perspective views showing another embodiment according to the present invention.
Figure 6B:
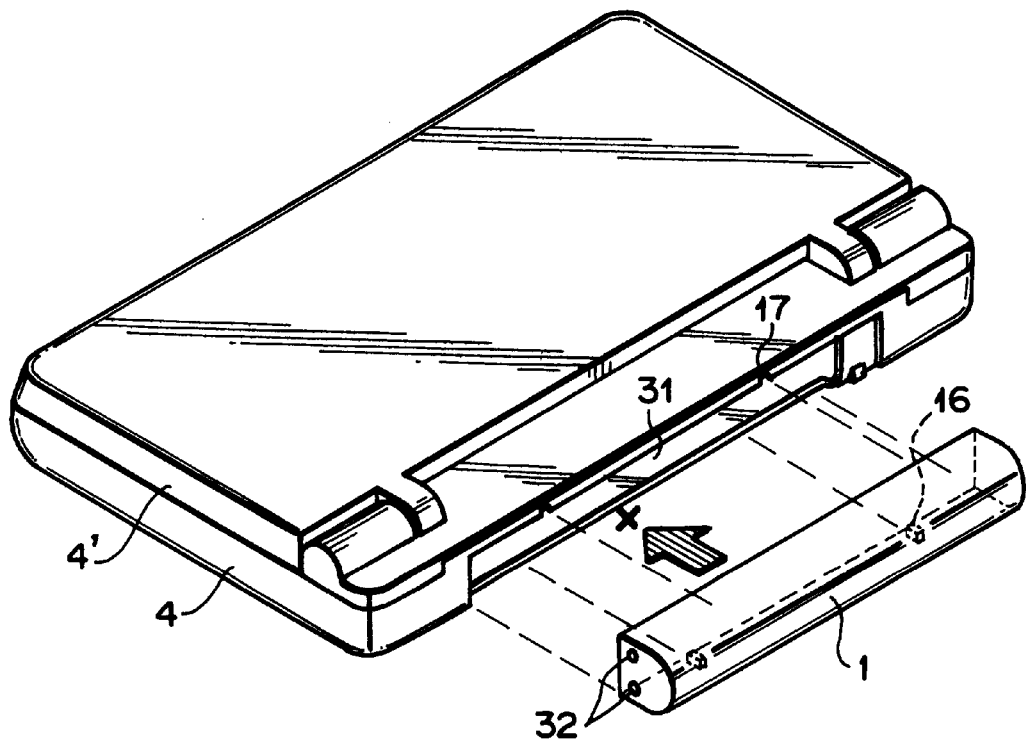

In the embodiment shown in FIGS. 6A and 6B, a projection 16 and a groove 17 which are engaged with each other are provided to the facing surfaces of the battery 1 and the housing 4 so that the battery 1 cannot be accommodated into the battery accommodating room 31 if it is in the inverse position. FIG. 6A shows a case where the battery is loaded in the correct direction, and FIG. 6B shows a case where the battery is loaded in the inverse direction (i.e., the battery is loaded while facing in the inverse direction). In FIGS. 6A and 6B, the projection 16 is located at the battery 1 side, and the groove 17 is located at the housing 4 side. However, the same effect could be obtained even if the groove is located at the battery 1 side and the projection is located at the housing 4 side.

Figure 7A:
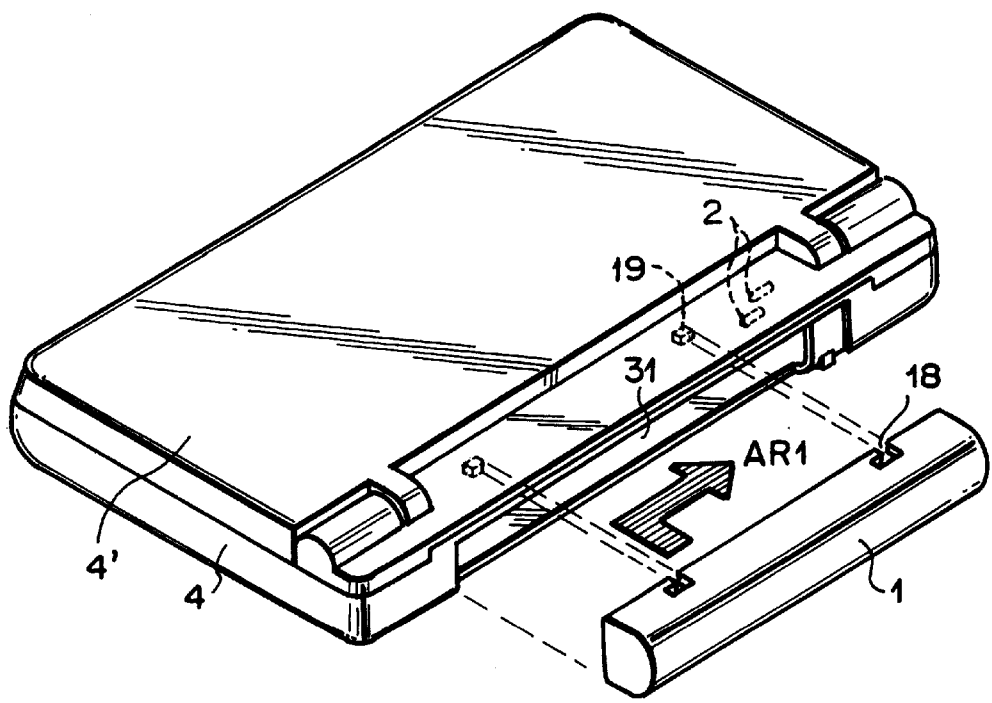
FIGS. 7A and 7B are perspective views showing further embodiment of the present invention.
Figure 7B:
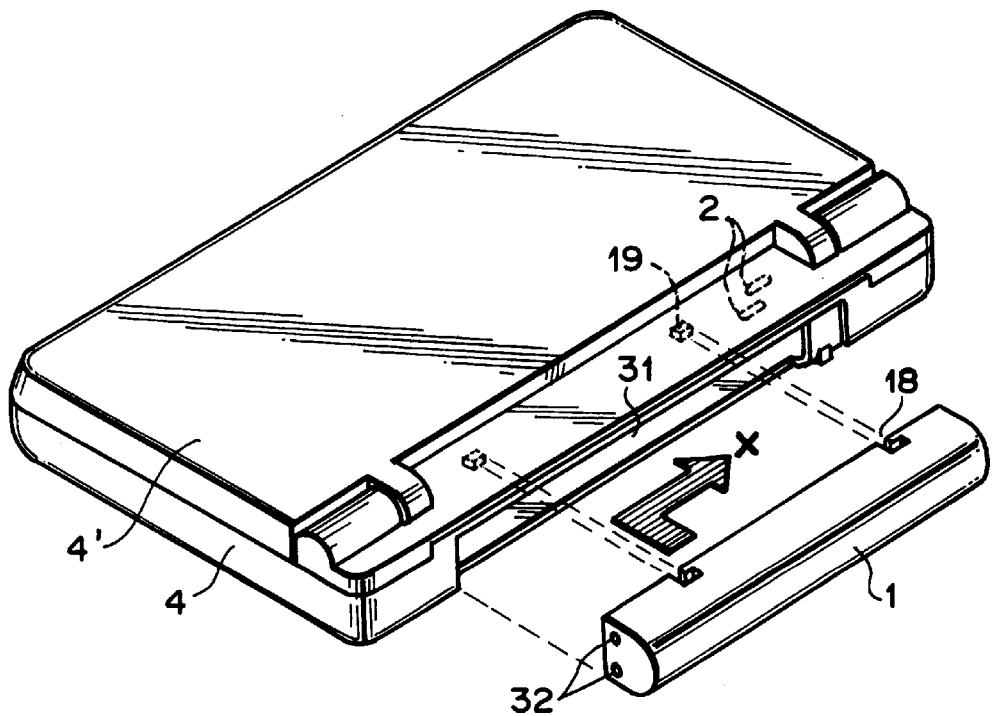

In the embodiment shown in FIGS. 7A and 7B, a right-angled groove 18 and a projection 19 which are engaged with each other are provided to the confronting faces of the battery 1 and the housing 4 so that even when the battery 1 is loaded in the inverse direction, the battery 1 can be temporarily accommodated in the battery accommodating room 31, however, it cannot be afterwards slid toward the electrode portion 2. FIG. 7A shows a case where the battery 1 is loaded in the correct direction, and FIG. 7B shows a case where the battery 1 is loaded in the inverse direction. In the embodiment shown in FIGS. 7A and 7B, the groove 18 is located at the battery 1 side and the projection 19 is located at the housing 4 side. However, the same effect could be obtained if the projection 19 is located at the battery 1 side and the groove 18 is located at the housing 4 side.

Figure 8:
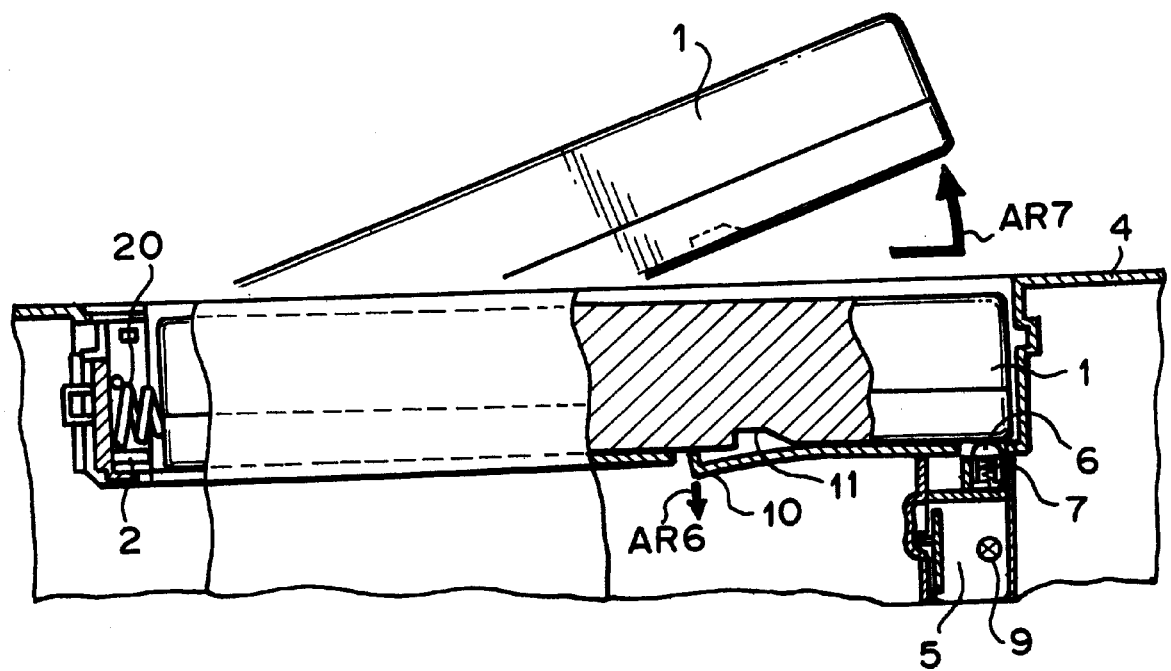
FIG. 8 is a cross-sectional view showing still further embodiment of the present invention.

In the embodiment shown in FIG. 8, a spring having a large push-out amount such as a coil spring 20 or the like is added to the electrode portion 2, thereby providing a function of pushing out the battery 1 to the position at which the battery 1 can be detached from the battery accommodating room 31.

As described above, according to the present invention, the following effects can be obtained.

(1) A first effect resides in that the battery 1 is perfectly covered by the housing 4 and the battery cover 3 under a normal use state of electronic equipment as shown in FIG. 2, and thus even when a drop impact is applied to the electronic equipment, the impact is not directly applied to the battery 1. Therefore, the failure probability of the electronic equipment can be reduced.

(2) A second effect resides in that the battery accommodating portion 31 can be laid out in the middle of a pair of hinge mechanisms (the rotational center thereof is represented by R) for opening/closing a display portion 4' of a portable computer by using the dead space of the electronic equipment as shown in FIGS. 1A and 1B, whereby the electronic equipment can be miniaturized.

(3) A third effect resides in that a general-purpose large-capacity battery can be used, and thus it is unnecessary to develop special-purpose batteries which are exclusively used for the electronic equipment, whereby the development cost and the development term for the batteries can be reduced, and low-price products can be supplied to the market.

What is claimed is:

1. A battery accommodating structure having a battery accommodating room which has an opening portion formed in one surface of a housing of electronic equipment, and a battery cover for closing the opening portion, characterized in that first engagement means for making an engagement between one end portion of said battery cover and a first portion of said housing which faces the one end portion of said battery cover, and second engagement means for making an engagement between the other end of said battery cover and a second portion of said housing which faces the other end portion of said battery cover are provided, an electrode portion connected to an electrode of a battery is disposed in the neighborhood of the first portion of said housing, and, said battery cover is moved toward the second portion relatively to said housing while the one end portion thereof is engaged with the first portion to substantially close the opening portion, thereby enabling the engagement of the other end portion thereof with the second portion, and that a lock piece is interposed between the battery and the other end portion of said battery cover while the battery disposed in said battery accommodating room is moved toward the first portion and the electrode of said battery is connected to said electrode portion, thereby preventing movement of said battery cover to the first portion of said housing and keeping the engagement between the other end portion of said battery cover and the second portion of said housing.

2. The battery accommodating structure as claimed in claim 1, wherein the lock piece is interposed between the battery and the other end portion of said battery cover, thereby preventing movement of the battery toward the second portion of said housing and keeping the connection between the electrode of the battery and said electrode portion.

3. The battery accommodating structure as claimed in claim 1, wherein said first engagement means comprise a first hook portion provided to one end portion of said battery cover and a first engagement portion provided to the first portion of said housing, and said second engagement means comprise a second hook portion provided to the other end portion of said battery cover and a second engagement portion provided to the second portion of said housing.

4. The battery accommodating structure as claimed in claim 3, wherein said first hook portion is formed on an inner surface of said battery cover, and said first engagement portion is formed on the side surface of said housing just below said opening portion.

5. The battery accommodating structure as claimed in claim 3, wherein said second hook portion is formed on the end surface plate of said battery cover, and said second engagement portion is formed on the wall surface of said housing which constitutes the inner surface of the end portion of said battery accommodating room.

6. The battery accommodating structure as claimed in claim 3, wherein said first hook portion is allowed to be detached from said first engagement portion in a first state where said battery cover is nearer to the first portion of said housing, and is inhibited from being detached from said first engagement portion in a second state where said battery cover is nearer to the second portion of said housing.

7. The battery accommodating structure as claimed in claim 1, further including moving means for moving said lock piece in a direction crossing a direction of the movement of said battery cover, said moving means being connected to an operating piece disposed on the outer surface of said housing.

8. The battery accommodating structure as claimed in claim 7, wherein said moving means has a lock mechanism which is held in an advance state where said lock piece advances to a gap between the battery and the other end of said battery cover and in a retreat state where said lock piece retreats from the gap between the battery and the other end portion of said battery cover.

9. The battery accommodating structure as claimed in claim 1, further including temporarily fixing means for temporarily fixing the battery in a state where the battery is moved toward the first portion of said housing, said temporarily fixing means being provided in said battery accommodating room.

* * * * *